Patented Nov. 20, 1934

1,981,132

UNITED STATES PATENT OFFICE 1,981,132

COMPOSITION FOR NONINFLAMMABLE CELLULOSIC FILM

James F. Walsh, South Orange, and Kirtland Flynn, East Orange, N. J., assignors to Celluloid Corporation, a corporation of New Jersey No Drawing. Application June 20, 1929, Serial No. 372,533

2 Claims. (Cl. 106—40)

This invention pertains to the general class of cellulosic plastics and particularly to the class of cellulosic plastics adapted for use in making photographic film.

This invention pertains more particularly to film made with cellulose acetate, which among other things, is employed for the purpose of reducing the fire hazard. Film has been made with cellulose acetate without other ingredients. However, same has many disadvantages, among which are, expansion upon contact with moisture and contraction upon drying to less than the original length. Film of this type is almost totally unsuitable for photographic film purposes as will be readily apparent. Such film also exhibits a tendency to burn, and is brittle.

The presence of plasticizers aids in overcoming brittleness, and in some cases reduces the tendency to burn. Many of such plasticizers, however, if present in a sufficient amount to be of practical benefit, show a marked tendency toward exudation with a consequent smudge or oiliness on the surface of the film which not only presents marked difficulties to substrating operations, but also substantially decreases the transparency of the film, tends to spot the film by making portions more transparent than others, and makes coating with photographic emulsions very difficult. These objectionable features in themselves have caused moving picture producers, photographers, operators of X-ray apparatus, etc. to be reticent in adopting cellulose acetate film in place of film made with nitrocellulose, although the latter is more or less highly inflammable.

Many of the plasticizers carry sufficient color in themselves or produce sufficient color when mixed with other plasticizers or when incorporated in cellulose acetate film, to substantially reduce transparency, with the result that film made therewith, is practically unsuitable for photographic purposes.

Many of the plasticizers are sufficiently soluble in water to exhibit a tendency to hydrolize and form acidic products to such an extent as to be detrimental. Many other plasticizers show a marked tendency to discolor in sunlight, and with age. Others emit objectionable odors or are high in cost. Many others cause a bloom or cloudiness when the film is given a more or less sharp bend. This latter feature is highly objectionable in film used for photographic purposes as will be readily apparent.

An object of the invention therefore is to provide a composition that is substantially unaffected by moisture.

A further object of this invention is to provide a composition in which the plasticizers do not appreciably exude.

A further object of the invention is to provide a composition which is substantially non-inflammable; that exhibits a marked resistance to discoloration by light and heat; that may be satisfactorily substrated and coated; that does not have ingredients which tend to hydrolize and form acidic products; that does not emit objectionable odors; that is relatively low in cost; that is highly transparent; that does not cause a bloom or cloudiness upon being bent; that is strong and tough in character, and that is otherwise highly satisfactory for its intended purpose.

In our novel composition we preferably employ along with cellulose acetate, specific proportions of an aromatic phosphate and an ester of phthalic acid. We prefer not to exceed 20 parts of aromatic phosphates to 100 parts of cellulose acetate, and prefer not to fall below 10 parts. We prefer not to exceed 15 parts of esters of phthalic acid to 100 parts of cellulose acetate and prefer not to go below 10 parts. The following formula produces excellent results. However, it is understood that this formula is given merely by way of illustration.

| | Parts |
|---|---|
| Cellulose acetate | 100 |
| Triphenyl phosphate | 20 |
| Diethyl phthalate | 10 |

The ingredients are mixed and colloided in any of the usual ways preferably with the aid of a suitable solvent such as acetone, ethyl lactate, ethyl methyl ketone, etc., or any of the known combinations of ethyl alcohol, methyl alcohol, acetone, chloroform, benzol, amyl acetate, ethyl lactate, ethyl methyl ketone and/or other more or less volatile liquids as found most effective for the results desired to form a dope suitable for film casting purposes on a suitable surface, such as a film casting wheel or belt, or any other apparatus.

With the formula given above we prefer to use a solvent composed of 85% acetone and 15% industrial ethyl alcohol. These specific proportions, however, may be varied somewhat. For instance 80%–90% acetone and 10%–20% ethyl alcohol produce good results. This proportion of ingredients is desired in order to obtain a dope having the lowest viscosity with the least amount of solvent, as well as a solvent of the desired volatility to produce proper strength and a practical rate of production of film, a solvent that is nontoxic, neutral, and commercially available substantially free from impurities likely to prove detrimental to the final product, a solvent that is photographically inert and that is composed of ingredients capable of being separated in substantially definite fractions.

After the ingredients are mixed and colloided in a kneader or otherwise and sufficient solvent added to form a flowable dope, this dope is preferably placed in the hopper of film casting apparatus and is cast upon a movable and preferably highly polished surface to form a continuous film of the desired thickness. For special purposes the surface may be given any desired finish by etching or otherwise to produce any desired surface on the film. When sufficiently dry, or in other words, at a point on the movable surface at which the film is sufficiently dry, to permit, the film is stripped from the surface and after being further dried it is wound up into rolls. The film is generally cast at the present time in either or two widths, to wit 21 inches or 43 inches. The film is then cut into strips of the required length and width for moving picture or other purposes.

Before cutting the film into strips however, it is first preferably substrated by suitable means and then coated with a light sensitive substance capable of recording an image. Substrating and sensitizing the film before it is cut into strips saves considerable time and labor and prevents excessive accumulation of scrap.

In place of diethyl phthalate, dimethyl phthalate, dibutyl phthalate and dibenzyl phthalate may be employed. Good results have also been obtained with dipropyl and diamyl phthalate.

Tricresyl phosphate or other aromatic phosphate may be substituted for triphenyl phosphate.

Film made with our novel composition is strong and tough; is substantially non-inflammable; is fairly resistant to the action of water; resists discoloration from light and heat; can be very satisfactorily substrated with unusually improved results; does not produce a cloudiness upon being bent; does not exude and is otherwise highly satisfactory for moving picture, X-ray, ordinary cameras and similar purposes.

It is of course understood that this novel composition may also be used for other purposes and in such event can be processed in any of the ways employed with cellulosic plastics. Sheets made from our film are very suitable for many purposes where a highly transparent product is desired, such as in laminated glass manufacture, curtains for automobiles, lamp shades, etc., etc. The dope may also be used satisfactorily for coating reticular materials such as wire cloth in the making of glass substitutes, or in lacquers, etc. If a transparent product is not desired pigments and fillers may be added to produce color and other effects, such as gypsum, talc, mica, barytes, clay, titanium oxide, iron oxide, cork, leather, rubber, cotton waste, wood flour, gums, etc., etc. either in granulated, pulverized or other forms. An unlimited variety of color and other effects may be produced in this manner.

It is understood that the above particular description is given merely by way of illustration, and that many variations may be made in the same within the scope of the claims without departing from the spirit of the invention.

We claim:

1. A plastic composition comprising 100 parts of cellulose acetate, 20 parts of triphenyl phosphate and 10 parts of diethyl phthalate.

2. A composition of matter comprising 100 parts of cellulose acetate, 20 parts of triphenyl phosphate, 10 parts of diethyl phthalate, and a solvent composed of 85 parts of acetone and 15 parts of ethyl alcohol.

JAMES F. WALSH.
KIRTLAND FLYNN.